(12) United States Patent
Sinfield et al.

(10) Patent No.: US 12,123,777 B2
(45) Date of Patent: Oct. 22, 2024

(54) METHODS, ALGORITHMS AND SYSTEMS FOR SUB-NANOSECOND DIGITAL SIGNAL PROCESSING OF PHOTOMULTIPLIER TUBE RESPONSE TO ENABLE MULTI-PHOTON COUNTING IN RAMAN SPECTROSCOPY

(71) Applicant: Purdue Research Foundation, West Lafayette, IN (US)

(72) Inventors: Joseph Sinfield, West Lafayette, IN (US); Yu-Chung Lin, Boxborough, MA (US)

(73) Assignee: Purdue Research Foundation, West Lafayette, IN (US)

( * ) Notice: Subject to any disclaimer, the term of this patent is extended or adjusted under 35 U.S.C. 154(b) by 379 days.

(21) Appl. No.: 17/730,374

(22) Filed: Apr. 27, 2022

(65) Prior Publication Data
US 2022/0341784 A1 Oct. 27, 2022

Related U.S. Application Data

(60) Provisional application No. 63/180,483, filed on Apr. 27, 2021.

(51) Int. Cl.
*G01J 3/44* (2006.01)
*G01N 21/65* (2006.01)
*G01J 1/44* (2006.01)

(52) U.S. Cl.
CPC ............... *G01J 3/4412* (2013.01); *G01J 3/44* (2013.01); *G01N 21/65* (2013.01); *G01J 2001/442* (2013.01)

(58) Field of Classification Search
CPC ............. G01J 2201/4433; G01J 3/4412; G01J 2001/442; G01J 3/44
See application file for complete search history.

(56) References Cited

U.S. PATENT DOCUMENTS

| | | | |
|---|---|---|---|
| 2007/0170353 A1* | 7/2007 | Chou | G01J 1/42 250/214.1 |
| 2011/0261354 A1* | 10/2011 | Sinfield | G01J 3/021 356/301 |

FOREIGN PATENT DOCUMENTS

WO WO-2021214312 A1 * 10/2021 ............... G01J 1/44

\* cited by examiner

*Primary Examiner* — Jennifer Bahls
(74) *Attorney, Agent, or Firm* — Brannon Sowers & Cracraft PC; Kevin R. Erdman

(57) ABSTRACT

A method of determining the contributions of multiple incident photons to an output of a sensor, including providing a photonic sensor having a sensor input and capable of generating an electrical signal proportional to a number of photons interacting with the photonic sensor input as a function of time, calibrating the photonic sensor such that a response of the photonic sensor to a single photon detected is in a waveform having an amplitude and a time, wherein the product of the amplitude and the time is statistically bounded, determining a probabilistic boundary between one or more of electrical, optical, and thermal sources of noise of the sensor, acquiring a response wave form from the photonic sensor through analog-to-digital conversion with a resolution in amplitude and time corresponding to accuracy required in quantifying the response wave form, storing each acquired response wave form, individually, in a format selected from the group consisting of real-time and buffered packets in digital form, and determining a total count of likely photon arrivals for a specific time resolved acquisition.

17 Claims, 12 Drawing Sheets

METHODS, ALGORITHMS AND SYSTEMS FOR SUB-NANOSECOND DIGITAL SIGNAL PROCESSING OF PHOTOMULTIPLIER TUBE RESPONSE TO ENABLE MULTI-PHOTON COUNTING IN RAMAN SPECTROSCOPY

TECHNICAL FIELD

This disclosure relates generally to Raman spectroscopy, and, in particular, to assemblies, methods, algorithms, and systems for sub-nanosecond digital signal processing of photomultiplier tube response to multiple incident photons.

BACKGROUND

This section introduces aspects that may help facilitate a better understanding of the disclosure. Accordingly, these statements are to be read in this light and are not to be understood as admissions about what is and/or is not prior art.

Raman spectroscopy is a popular analytical technique employed to evaluate solids, liquids, and gasses due to its simplicity and non-destructive nature. When performing Raman spectroscopy, a monochromatic light source (such as a laser) is directed toward a sample and photons that become inelastically scattered by the sample are observed. Changes in the energy of the inelastically scattered photons relative to that of the incident radiation reveal the vibrational and rotational energies of the molecular bonds of the target, providing the foundation for structural and stoichiometric analysis of the sample. In order to observe Raman scattering, optics are utilized to collect and direct scattered photons to a dispersive device that separates spectral constituents spatially before transmission to a light sensor that assesses the intensity of scattered returns over narrow spectral bands. When reported in wavenumbers ($cm^{-1}$) indicative of the energy lost (or gained) in photon-sample collisions, the collection of scattered photon observations forms a Raman spectrum representative of the sample composition, which is independent of the excitation frequency in form, albeit variable in absolute intensity (($/\sim 1/\lambda^4$).

Despite the overall merits of Raman analysis, including its high chemical-specificity, relatively short test duration, and limited need for sample preparation, one of Raman spectroscopy's limitations is that the intensity of the Raman phenomenon is usually very low compared to the excitation source. While some compounds may have a relatively strong Raman response, low-Raman yield samples (i.e., having a low Raman cross-section or concentration) display limited scattering and are thus not easily observed. This has led to bifurcation in optical sensor operating modes and related light detection algorithms. Some systems are optimized for comparatively strong scatterers and make use of detectors that generate an analog output in proportion to (considerable) collected photon flux. Other systems, employed specifically to assess weak scatterers, rely upon photon counting—that is the detection and accumulation of single-photon observations—to develop a Raman signature.

While single-photon detection is in itself a challenging task, the limits of its effectiveness are compounded by the fact that the typical algorithm used in to define photon detection applies a single threshold to discern a photon-arrival, in what amounts to a binary analysis. Although there is the potential for more than one photon arrival to contribute to a given optical sensor response, this algorithm will ignore output in excess of the threshold and the potential contribution of additional photons is lost. This is most pronounced when a single-threshold detector is saturated in situations involving observation of a strong scatterer—effectively each counting opportunity yields an observation that is capped at one photon and changes in the strength of the scatterer can no longer be observed.

Based on the above, there is an unmet need for a multi-photon counting assembly that objectively counts these otherwise missed photons, thus offering the potential to improve test sensitivity and efficiency, particularly in the middle ground between traditional single threshold approaches and those that rely upon significant photon flux.

BRIEF DESCRIPTION OF DRAWINGS

Some of the figures shown herein may include dimensions. Further, some of the figures shown herein may have been created from scaled drawings or from photographs that are scalable. It is understood that such dimensions, or the relative scaling within a figure are by way of example, and not to be construed as limiting.

(FIG. 7A) PMT response as a function of time, and (FIG. 7B) relationship between absolute value of average peak output and neutral density filter transmission.

DETAILED DESCRIPTION

Figures 1A, 1B, 1C, 1D, 1E, 1F:
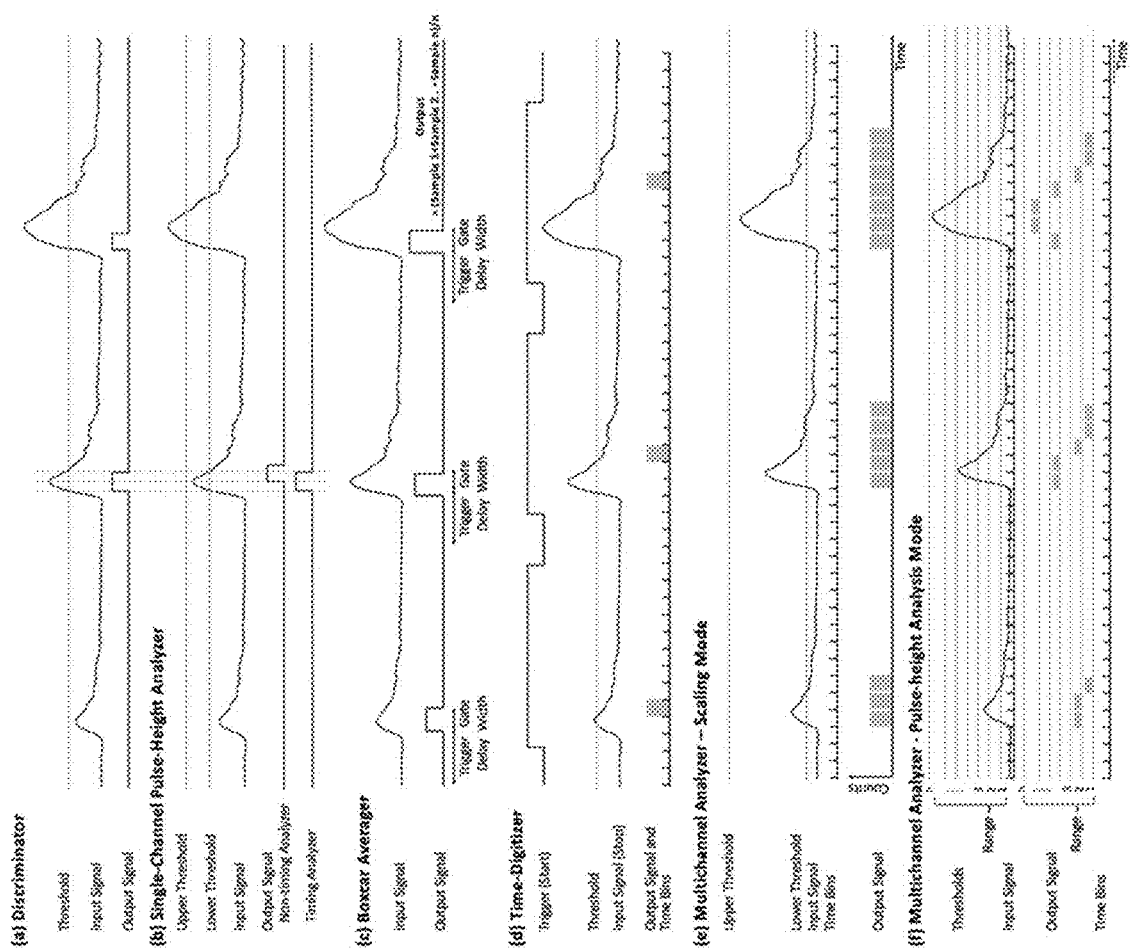
FIGS. 1A-1F show Common PRIOR ART Photon Counting Devices' Outputs in Response to an Input Signal.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates. At least one embodiment of the present disclosure will be described and shown, and this application may show and/or describe other embodiments of the present disclosure. It is understood that any reference to "the disclosure" is a reference to an embodiment of a family of disclosures, with no single embodiment including an apparatus, process, or composition that should be included in all embodiments, unless otherwise stated. Further, although there may be discussion with regards to "advantages" provided by some embodiments of the present disclosure, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present disclosure, is discussion of one or more tests that were performed. It is understood that such examples are by way of example only and are not to be construed as being limitations on any embodiment of the present disclosure. Further, it is understood that embodiments of the present disclosure are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the disclosure. As used herein, a computer implemented method refers to a method which involves the use of a computer, computer network or other programmable apparatus, where one or more features are realized wholly or partly by means of a computer program. A non-transitory computer-readable storage medium refers to a medium having stored thereon software instructions that, when executed by a processor, cause the processor to generate control signals for executing predetermined steps.

This document may use different words to describe the same element number, or to refer to an element number in a specific family of features. It is understood that such multiple usage is not intended to provide a redefinition of any language herein. It is understood that such words demonstrate that the particular feature can be considered in various linguistical ways, such ways not necessarily being additive or exclusive.

What will be shown and described herein are one or more functional relationships among variables. Specific nomenclature for the variables may be provided, although some relationships may include variables that will be recognized by persons of ordinary skill in the art for their meaning. For example, "t" could be representative of temperature or time, as would be readily apparent by their usage. However, it is further recognized that such functional relationships can be expressed in a variety of equivalents using standard techniques of mathematical analysis (for instance, the relationship F=ma is equivalent to the relationship F/a=m). Further, in those embodiments in which functional relationships are implemented in an algorithm or computer software, it is understood that an algorithm-implemented variable can correspond to a variable shown herein, with this correspondence including a scaling factor, control system gain, noise filter, or the like.

This disclosure describes an approach to achieve multiple-photon counting for Raman spectroscopy. In this disclosure multiple photon counting and multi-photon counting are used synonymously. And both refer to counting of more than one photon received by a sensor as opposed to counting zero or one photons received by the sensor. The multi-photon counting process is made possible by recording and analyzing the photon detector, such as a photomultiplier tube (PMT), response to each pulse of a pulsed laser in a (typically time-resolved) Raman spectroscopy system. Conventional Raman spectroscopy typically considers photon arrivals as binary events assessed by a single threshold. Hence, the conventional algorithm ignores the fact that multiple photons could arrive within the same response, sacrificing potential signal gain. In this disclosure a high-speed data acquisition system and multi-threshold DSP (Digital Signal Processing) counting algorithm are employed to facilitate multi-photon counting—a data processing approach that differentiates photon arrival events by amplitude and time and contributes to improved Raman detection sensitivity. The multi-photon counting algorithm enables lower concentration detection, greater sensitivity, shortens experiment duration, and improves noise rejection. Results from analyses of aqueous solutions of nitrate, isopropanol, and rhodamine 6G demonstrate the versatility and effectiveness of this algorithm. The algorithm increased system sensitivity by ~2.0, 2.0, and 3.1-fold, compared to traditional single-threshold analyses of the same data for tests performed on nitrate, isopropanol, and rhodamine 6G, respectively. Results also demonstrated that the multi-photon counting algorithm increases the upper analysis limit for high Raman-yield compounds, shifting the saturation threshold to a higher concentration in typical concentration vs. intensity calibration curves.

Photon counting devices: Photon counting, performed using devices that acquire and discriminate the output signal from optical sensors, has been achieved by different researchers with a variety of devices. Chief among these are the discriminator, the single-channel pulse-height analyzer, the boxcar averager, the time digitizer, and the multi-channel scaler.

The discriminator can be considered a fundamental tool for analyzing the spectroscopic signal in photon-counting analysis. A discriminator outputs a logic pulse only if the input pulse has a sufficient amplitude to exceed a preset threshold, and therefore, it is also known as an amplitude discriminator. The threshold is often set right above the observed noise level to reduce the influence of noise on the output. When the input signal's leading edge crosses the pre-established threshold level, the discriminator produces an output pulse without consideration for the exact input amplitude. The time delay between the input pulse and the output signal is affected by the detector's rise time, such that the shorter the rise time, the faster the output signal can reach the threshold and generate an output signal. FIG. 1A illustrates the typical relationship between input pulse amplitude and related output for a discriminator. A fast-timing discriminator is commonly used in photomultiplier tube (PMT) photon counting and can effectively count narrow pulses and precisely mark the pulses' arrival time at high frequency.

Figure 2:
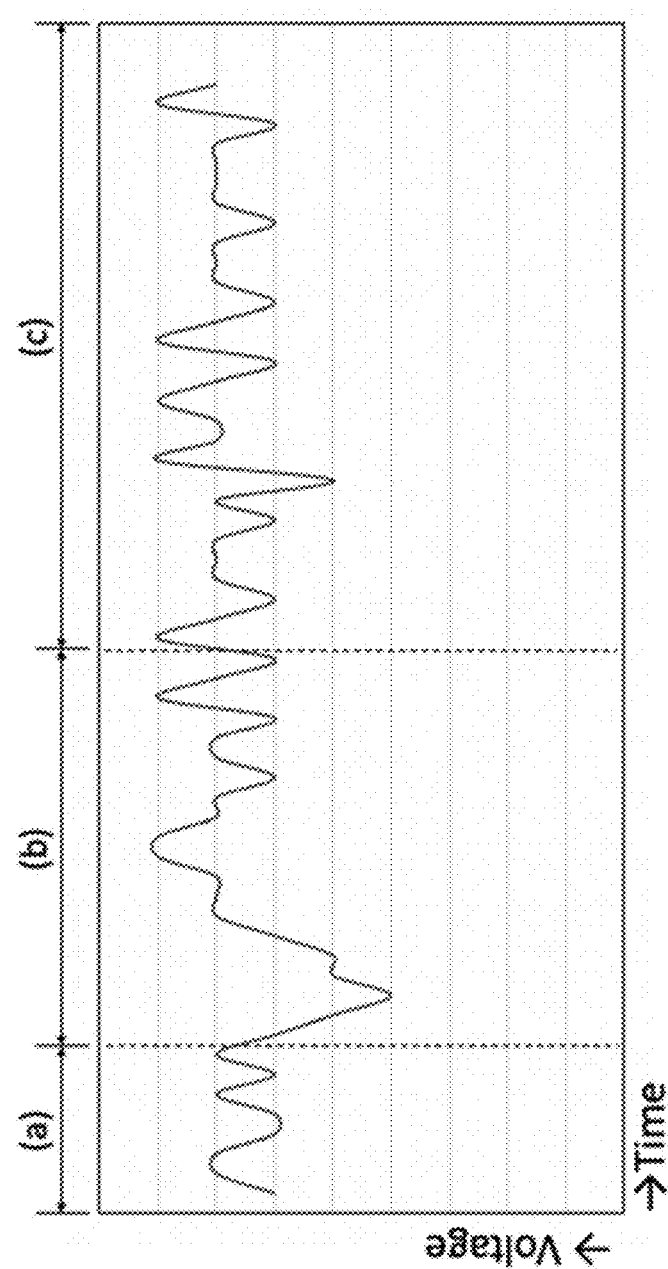
FIG. 2 shows an illustrative PMT response to a laser pulse: (a) signal acquired upon pre-event trigger; no Raman information, (b) window of arrival for any scattered photons, and (c) post laser pulse; no Raman information.

A single-channel pulse-height analyzer (differential discriminator) usually deals with slower pulses at lower counting rates compared to a discriminator. A single-channel pulse-height analyzer also uses thresholds to discriminate the input signal, but with a pulse-height window defined by a lower-level and an upper-level threshold. Only when an input signal has an amplitude that falls between the lower-level and upper-level thresholds will the instrument output a logic pulse (or count). The lower and upper thresholds can usually be set independently, but in some cases, a range between the two thresholds is defined first, so that the upper level will be adjusted accordingly when the lower level is changed. If the upper-level threshold is removed, the single-channel pulse-height analyzer will act as a discriminator. Two common analyzers, that is non-timing and timing analyzers, are used in data acquisition scenarios. FIG. 2 illustrates the responses of different single-channel pulse-height analyzers. A non-timing analyzer is usually used in applications when the time of occurrence is not essential. If the input signal satisfies the detection window requirement, the output logic pulse is produced when the trailing edge of the input signal re-crosses the lower-level threshold. In contrast, a timing analyzer is often used for applications that require a precise timestamp at the occurrence, and in these cases the output is produced when the input signal reaches its peak (within the pre-defined window). The single-channel pulse-height analyzer only considers if the input signal peak falls within the pre-defined window and then outputs a fixed-height logic pulse, without differentiating different input pulse amplitudes within that window. Note that multi-channel pulse-height analyzers also exist, but operate on the same principles discussed above, but of course involve greater complexity.

A boxcar averager (gated integrator, boxcar integrator) integrates the input signal voltage and outputs a pulse like the mathematical boxcar function, which is zero over time and some constant indicative of the integrated observation over a single gate interval. In static gate mode operation, the averager only samples and integrates the input signal during a pre-defined time window (gate width) and ignores the input at all other times, in an effort to separate signal from noise in a procedure often termed mode locking. The averager starts the integration for a pre-defined period (gate width) after receiving a trigger (often with a trigger delay). After repeated triggers, the integrated signals are averaged over the number of acquired events. The trigger delay in this mode is fixed; and the time when sampling starts is always the same relative to the trigger. The average signal obtained over the pre-defined sampling gate width is output and employed as an indicator of observed signal intensity. FIG. 1C presents the operating principle of a boxcar averager.

Another device, the time digitizer, may be used in Raman experiments as a counter enabling logging of events in a digitized format with timestamps of event occurrence. For this device, a measurement requires a start pulse and a stop pulse to define the measurement time interval. The start pulse, which initiates the measurement, is often an externally supplied trigger, while the stop pulse is the input signal to be observed. To perform a measurement, the device starts recording when the start pulse is received and its rising edge crosses a set threshold and stops recording when the falling edge of the observed signal (stop pulse) crosses a pre-defined threshold. When an event defined by the start and stop pulses occurs, the counter will register one event count in the output bin defined by the stop-time arrival in the internal clock. A faster clock is needed for finer-time resolution or a higher-frequency test. The time-digitizer outputs histograms of stop events as a function of the start-to-stop time FIG. 1D. Event counts are repeatedly added to the histogram after each measurement in effort to improve signal to noise.

One other device sometimes used for photon counting is the multi-channel analyzer (MCA). The device records incoming signals in two ways, the scaling mode and the pulse-height analysis mode. In the scaling mode, this device develops a record of the number of threshold-defined events as a function of time. A trigger starts a counter, and input signal events (voltage pulses) that cross a pre-defined threshold or fall within an amplitude range defined by a lower and upper bound, are recorded within each sequential time bin. The device then outputs a histogram of counts per time bin FIG. 1E. In the pulse-height analysis mode, input signals are sorted based on their amplitude, in voltage ranges that are a function of the full-scale input range of the device and the number of available MCA channels, and selected edge sampling can often be enabled to permit sampling voltage analysis to capture the peak amplitude of either rising or falling signals in any given time bin (FIG. 1F). Over successive acquisitions, which may be run in multiple parallel sets, or sequential scans across channels depending upon the number of analog-to-digital converters incorporated in the MCA, the device outputs a histogram of the number of counts obtained at each discernable pulse height.

While the pulse height analysis functionality of multi-channel analyzers is indeed desirable for time-resolved Raman experiments, current MCAs make use of analog-to-digital converters capable of only modest sampling rates (MSa/s or slower), and substantial inter-pulse time, often on the order of tens of nanoseconds to microseconds, is required to transfer and tally registered counts. This limits their use to radiometric observations, and spectroscopic applications involving somewhat lengthy input pulse durations (for example, fluorescence spectroscopy), that in many cases must also be tolerant of dwell or dead time between observations. This makes these devices ineffective for many time-resolved Raman spectroscopy applications, particularly those that take advantage of the recent emergence of sub-nanosecond pulsed optical sources.

From the discussion above, although several different devices can be used for photon counting, those capable of effectively observing short pulse duration and/or high repetition rate spectroscopic phenomena all apply similar detection criteria—a threshold or amplitude window that defines photon arrival events, without considering the number of photons that caused it, and operate in real time, limiting both the information content and speed of observations.

Single-photon detectors: Photon-counting with any of the devices described above relies upon single photon detection. The detector employed in most Raman spectroscopy systems is either a photomultiplier tube (PMT), charge-coupled device (CCD), or avalanche photodiode (APD). These detectors rely on the photoelectric effect and convert light into electrical signals for further processing into a Raman spectrum. An appropriately selected PMT is typically significantly more sensitive than a CCD and is especially suitable for low-light detection but can only examine one spectral band at a time. In contrast, the arrayed nature of a CCD, while often requiring external cooling to minimize noise and increase sensitivity, can observe several Raman bands of interest simultaneously. APDs used in Raman spectroscopy are often single-photon avalanche photodiodes (SPAD) built into an array by complementary-metal-oxide semiconductor (CMOS) technology. In this configuration they typically provide a compromise in performance somewhere between a PMT and a CCD, with quantum efficiency somewhat poorer than a PMT, and larger pixel size, and thus more limited spectral resolution than a CCD.

For the most challenging spectroscopic applications, PMTs remain the most commonly utilized optical sensor. In a PMT, detection involves a (photo)electron cascade that is initiated when photons reach the device's photo cathode. The photoelectrons are then accelerated via a voltage differential to impact a series of dynodes and more electrons are generated at each dynode before the electrons finally impact the anode to form a current pulse. The pulse is transmitted through a system impedance to yield a voltage output that can be acquired as a waveform as a function of time. This waveform, which is the PMT response to the scattering collected from one laser pulse, is usually observed with a data acquisition system (DAQ) for data processing.

PMT response: A PMT response waveform can be categorized into three regions, as shown in FIG. 2 The first region contains no response and results from the DAQ acquiring data upon receiving a pre-event trigger. The second region of the waveform marks the time period in which any Raman scattered photons could arrive. The time included in this region is directly linked to the laser pulse duration and any system transit spread as the Raman phenomenon can only occur when there is excitation energy that can be scattered. The third region is the tail of the waveform after photon arrivals have ended. Here the laser is off, and therefore there is no Raman photon information in this region.

Within the Raman arrival region, the PMT response to a photon arrival usually appears as a negative voltage vs time waveform as shown. In addition, or in lieu of signal associated with the photon arrival event, there is background noise, and, on rare occasions, anomalous high-intensity noise which may stem from non-systemic electromagnetic interference, that could be falsely interpreted as photon arrivals. Because we capture every sensor response we can determine if any response has been compromised. If an anomalous output occurs, such as a major voltage spike, the algorithm can remove the anomalous data point so it does not interfere with results.

Photon counting principles: Photon counting is enabled by awareness of the relationship between photon frequency and photon energy, which in turn directly impacts detector output. One photon is equivalent to a specific amount of energy, E, according to the Planck relationship, $E=h\nu$ (where h is Planck's constant and v is the frequency of the photon). Thus, a photon impact with a detector can produce an output signal waveform with a probabilistically bound range of amplitude and time characteristics given the amplification and impedance characteristics of the system used to detect it, and consideration of the inevitable effects of noise (shot, electrical, and optical) on system observations.

Figure 3:
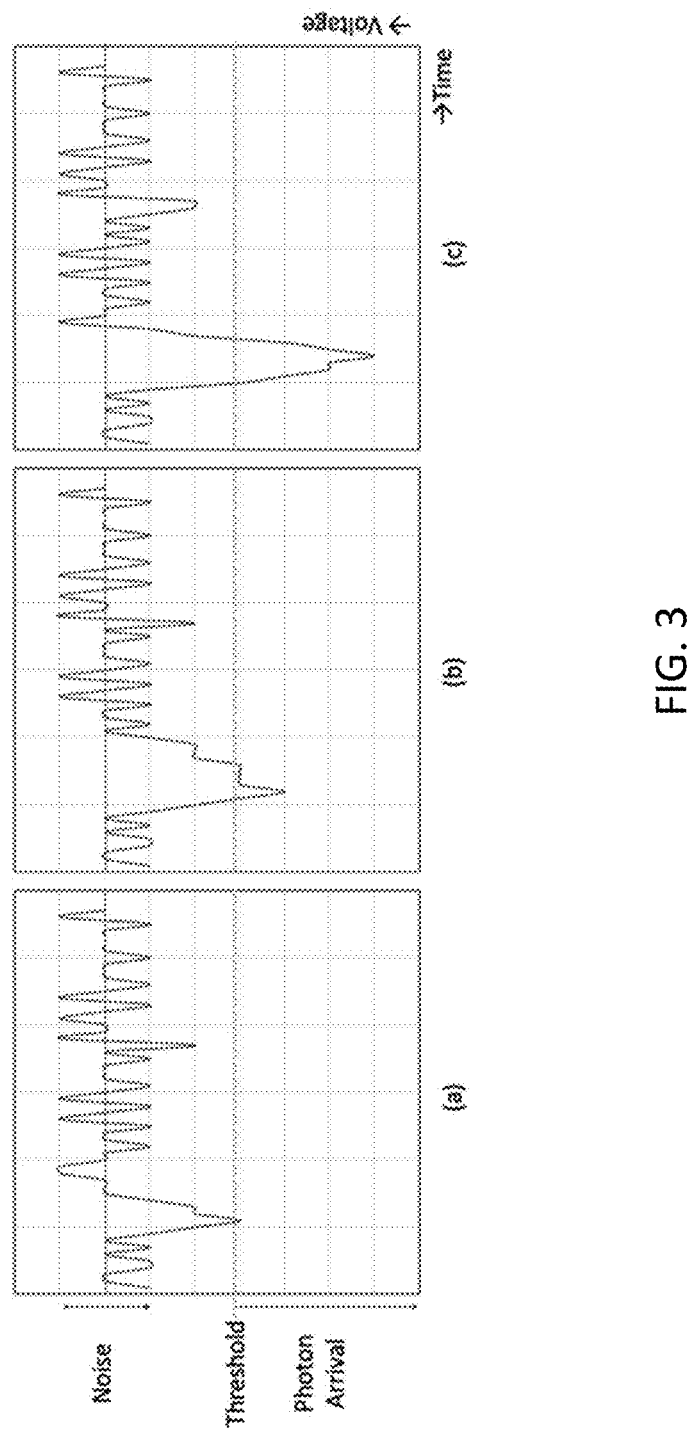
FIG. 3 shows an illustrative PMT responses for: (a) a single-photon arrival event, (b) two (can be more than two in some cases) photon arrivals within a relatively short time leading to an overlapped waveform, (c) multiple photon arrivals within the same time frame causing a deeper peak.

The arrival of multiple photons at the PMT photocathode in a given period of time, that is an increase in photon flux, will therefore naturally cause a change in PMT response relative to that associated with a single-photon arrival (FIG. 3). FIG. 3 contrasts a typical PMT response to a single photon (section a of FIG. 3), with changes in PMT output amplitude and duration when more than one photon arrives within a relatively short time, or multiple photon arrivals occur in the same time frame.

Figure 4:
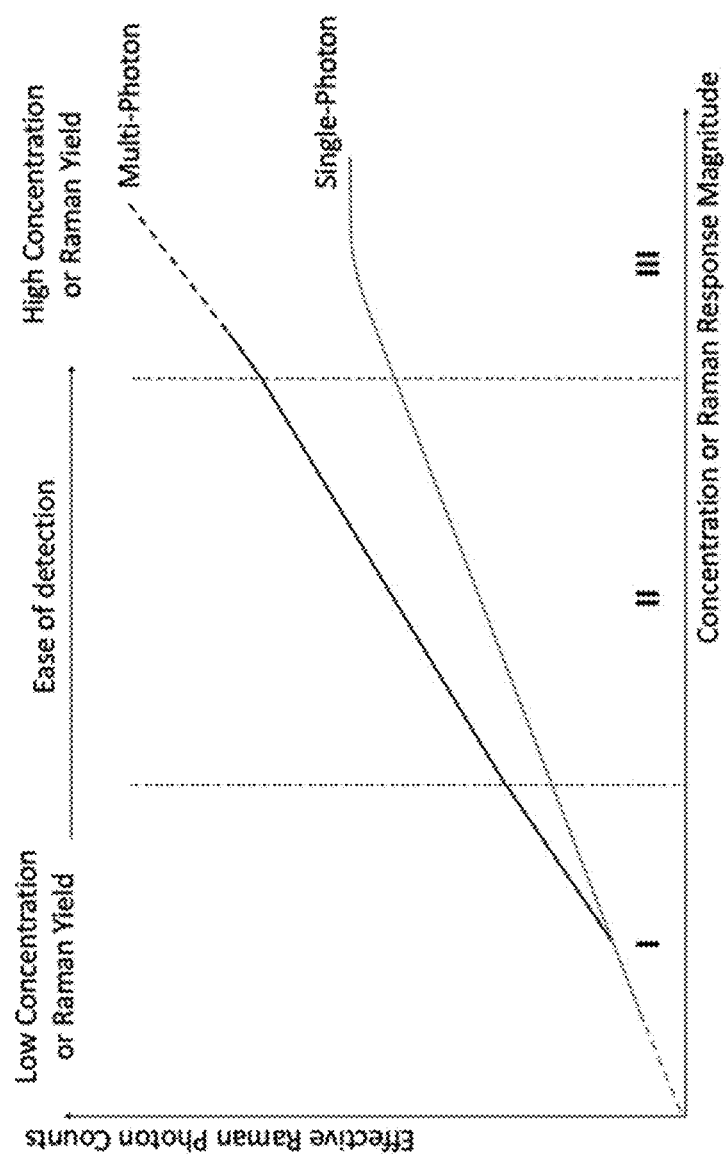
FIG. 4 shows conceptual Raman detection regimes: (I) low Raman yield; conventionally challenging to detect; potential multi-photon counting benefit; (II) moderate Raman yield, traditionally detectable, significant potential for multi-photon counting benefit; (III) high Raman yield, typically straightforward to detect; opportunity for extended detection range without sensor saturation.

With these response waveforms in mind, one can conceptually identify three primary photon counting observation regimes which reflect the inherent linkage between sample Raman yield and PMT response, as illustrated in FIG. 4. These regimes stem from the potentially different Raman yields that may be obtained from an analyte of interest in a sample due to its Raman cross-section or concentration, and/or the overall detection and collection efficiency of the Raman system. Regime I pertains to a low Raman yield sample in which the analyte of interest would likely be difficult to observe. The Raman signature of the analyte might be obtained in a conventional Raman system via single photon counting over an extended analysis time, with achievable detection sensitivity limited by the inevitable plateau of the signal-to-noise ratio. Here, analysis could potentially benefit from multi-photon counting, in which occasional multi-photon arrivals that would be missed by a single threshold detector, could bolster the signal, noting that even these events may not be consistent enough to provide repeatable gains.

In the second regime (FIG. 4 section II), the Raman yield is higher than in the first. The signature of interest is readily detectable through single-photon counting after enough test time, and multi-photon detection could significantly reduce test time or help detect a lower concentration than otherwise feasible by enhancing signal to noise. In the third regime (FIG. 4 section III), the Raman yield is high due to the intrinsic characteristics of the sample that would include a high concentration and/or high Raman cross-section. The signature of interest would likely be readily detectable as the Raman scattering would be strong, and conventional single-photon counting would typically provide adequate information. However, when analyzing a strong scatterer, it is also common that the relationship between analyte concentration and PMT response—often referred to as the calibration curve—reaches a plateau because almost every laser pulse yields a count in each observed time period. Thus, high concentrations of the analyte become indistinguishable. In this scenario, multi-photon counting could more readily enable differentiation of high concentration samples, extending the effective range of the detector, as the counting approach can discern the number of photons within a PMT response.

In this disclosure are described assemblies, methods, systems and algorithms to enable multi-photon counting and contrasts the results of single- and multi-photon counting Raman analyses performed on samples representative of the spectrum of observation regimes detailed above.

The characteristics of an acquired Raman signature arise from the analyzed compound and the components in a Raman system, as defined by what is termed the system transfer function. In this disclosure, a time-resolved Raman spectroscopy system (TRRS) was employed to explore the potential to achieve gains in testing efficiency and system sensitivity over traditional single-photon counting via use of a multi-photon counting approach. Assessment of the effectiveness of the multi-photon counting approach was evaluated through examination of a series of Raman analyses performed on single-compound aqueous solutions of nitrate ($NO_3^-$), isopropanol ($CH_3CHOHCH_3$), and rhodamine 6G ($C_{28}H_{31}N_2O_3Cl$), which through variation in aqueous concentration, effectively span a range of weak to strong scatterers.

A description of the Raman apparatus employed herein is described below along with a detailed characterization of the system optical detector—a PMT—in terms of its voltage versus time response to single and multi-photon stimuli when used in conjunction with the test apparatus and accompanying data acquisition system. The PMT response characteristics are then applied to inform formulation of single- and multi-photon counting algorithms, which are first developed conceptually and then framed for implementation using performance parameters specific to the test apparatus. In addition, a description of the samples and testing procedures pursued to assess and contrast the performance of the developed single- and multi-photon counting algorithms is also presented.

In an effort to assess the potential of multi-photon counting, a novel data acquisition system (DAQ) with custom control software was incorporated into a previously built time-resolved Raman spectroscopy system (TRRS). Excitation is provided using a 532 nm, 3 µJ/pulse, 5 kHz repetition rate pulsed laser, with a pulse duration of <600 ps, which is directed toward a sample in an open path setup. Scattered light is collected in a 90° backscatter configuration and guided to a ⅛ m monochromator. Dispersed scattering is observed using a PMT. The output of the PMT is acquired with an 8-bit, 2 GS/sec digitizing card for a duration of 30 ns (inclusive of pre-trigger, Raman arrival, and post pulse regions) following a photodiode trigger mode-locked with the excitation pulse. This results in the capture of a 60-point waveform, over a peak-to-peak full scale output range of 100 mV for every laser pulse. Acquired waveforms are buffered on the DAQ, and transferred to a local hard disk after a preset number of PMT responses are acquired under software control. Acquired data is then post-processed to enable photon counting. Due to the ability to store all acquired waveforms, comparisons of single-photon and multi-photon counting algorithms described herein were implemented by repeatedly post-processing the same raw data sets, which facilitates ideal comparisons relative to those that would be obtained from different tests performed with different counting hardware.

Test Samples: Aqueous solutions of three different analytes were examined in experiments leading to this disclosure, namely nitrate ($NO_3^-$), isopropanol ($CH_3CHOHCH_3$), and rhodamine 6G ($C_{28}H_{31}N_2O_3Cl$). Solutions were prepared at different concentrations to intentionally span ranges of varying anticipated Raman return. All tests were performed on solutions contained in spectral-grade glass cuvettes.

The nitrate solutions, which included concentrations from 25 to 150 ppm nitrate-nitrogen, were prepared by diluting commercially available standard stock solutions with distilled deionized water to desired concentrations. A calibrated ion-selective electrode (ISE) was then used to verify the concentrations. For nitrate samples, analysis was centered on the 1045 $cm^{-1}$ Raman vibration [(vNO) symmetric stretch], with PMT responses collected from 0.9 million laser pulses. All measurements were repeated seven times.

The isopropanol solutions were prepared by performing a serial dilution of 91% medical-use isopropanol with distilled deionized water, to achieve 10,000 to 80,500 ppm isopropanol aqueous solutions. Analysis for isopropanol centered on the 819 $cm^{-1}$ Raman vibration [C—C stretching], with PMT responses acquired from ten thousand laser pulses, and all measurements repeated ten times.

Rhodamine 6G solutions were prepared by dissolving rhodamine powder in water and diluting the resulting solution down to 0.0001-0.0025 ppm. Here analysis centered on the 1363 $cm^{-1}$ Raman vibration [C—C stretching]. PMT responses from five thousand laser pulses were acquired, and all measurements were repeated ten times.

All PMT responses were acquired and stored on the DAQ memory during testing and then transferred to the computer hard drive after acquiring a preset number of responses. The response data were then post-processed using a custom code developed to implement the counting algorithms discussed below. The same acquired data were processed using both the single and multi-photon counting algorithms to eliminate any potential influence of test-to-test variations on comparison of the two alternative analysis approaches.

Photon Counting Algorithms:

Single (conventional) photon counting: Conventional single-photon counting was enabled herein through careful determination of the PMT voltage threshold used to signify the arrival of a photon. The threshold is defined based on the voltage a photon will generate at the PMT after considering theoretical and experimentally validated views of transfer function parameters for the system.

Figures 5A, 5B, 5C, 5D, 5E:
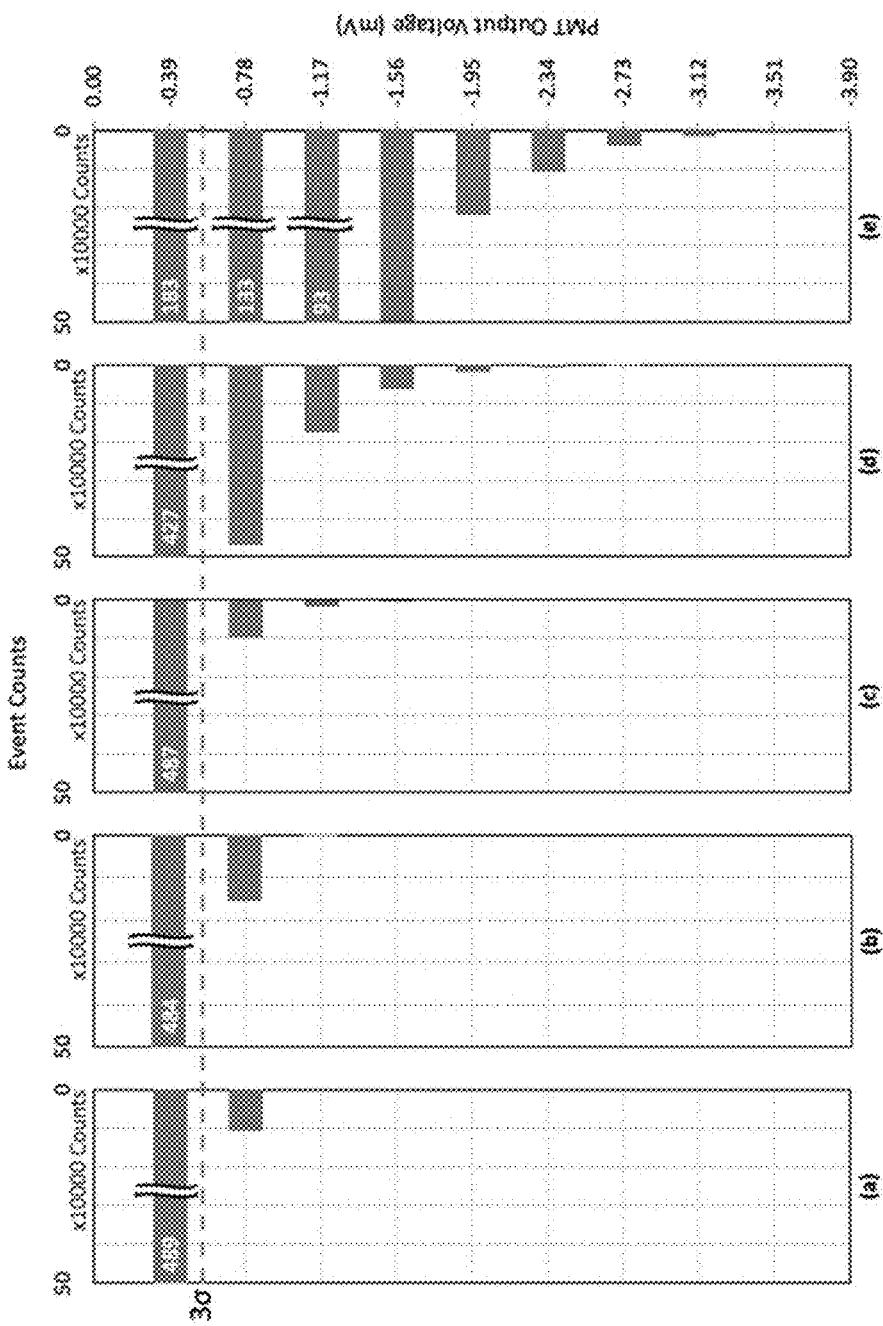
FIGS. 5A-5E show Peak voltage (negative) distributions in the scattered photon arrival window for varying scenarios: (a) closed monochromator; (b) off-peak observations with water sample; (c) 10 ppm nitrate-N aqueous solution at 1045 $cm^{-1}$; (d) 60,400 ppm isopropanol aqueous solution at 819 $cm^{-1}$, and (e) 0.001 ppm rhodamine 6G aqueous solution at 1363 $cm^{-1}$.

To develop an understanding of this threshold, output of the test apparatus PMT was observed under five scenarios (FIG. 5), each involving acquisition of PMT responses equivalent to observation of 5 million laser pulses. First, the output of the test apparatus PMT was observed with the entrance to the system monochromator closed for a period of time equivalent to the duration of 5 million laser pulse observations, providing an assessment of the PMT dark response. Given the very low inherent dark count rate of the PMT (<100 cps) and very short duration of the data acquisition period in the tests pursued herein (8 ns per acquisition), these observations are primarily composed of line noise and the occasional effects of induced electron cascades through a subset of the PMT dynode chain. These observations thus are mostly of lesser amplitude (less negative voltage) than would be expected from a photon arrival, with very limited outputs equivalent to or even slightly greater than that of a photon, and their distribution, being dominated by noise, tends toward normal at high numbers of observations. With this in mind, the PMT output voltage threshold defined to indicate the arrival of a photon was conservatively set at −0.78 mV, which represents the first observable bit level more than 3 standard deviations (3σ) outside the mean of the closed monochromator observations (a boundary at −0.55 mV). The distribution of the negative peak voltage (i.e., the minimum (most negative) voltage) acquired in the scattered photon arrival window for each of the closed monochromator observations is presented in FIG. 5A. Second, the PMT was monitored while collecting light off-peak from a water sample (FIG. 5B. These observations, which inevitably include background in the form of stray light, include an increase in −0.78 mV observations relative to the closed monochromator response, reinforcing the notion that the upper end of the closed monochromator scenario is indeed indicative of the response to a photon arrival. Third, observations were collected from tests performed on a low concentration (10 ppm nitrate as nitrogen) nitrate solution (examining the 1045 cm$^{-1}$ return), providing an indication of what can be anticipated to be predominantly single photon arrivals (FIG. 5C). Again, here a significant increase in observations at the −0.78 mV is recorded, along with a very small number of more negative observations. Fourth, observations of 60,400 ppm isopropanol aqueous solution centered on the 819 cm$^{-1}$ peak Raman shift (FIG. 5D) were obtained as an indication of what might be expected from single and occasional multi-photon arrivals. Lastly, observations of a 0.001 ppm rhodamine 6G solution were captured to explore the influence of a shift to a high flux sample, which would likely offer predominantly multi-photon returns (FIG. 5E), as evidenced by the considerable number of negative peak voltages crossing the single photon threshold.

Importantly, the defined single photon voltage threshold is also consistent with what would be expected considering the energy of scattered photons in the 556 to 574 nm range examined herein (E=3.57×10$^{-19}$ J to 3.46×10$^{-19}$J) a PMT gain of 10$^6$, output measurement across a 50Ω load, the influence (both positive and negative) of observed noise, and the voltage resolution of the employed data acquisition system, which collectively suggest that a single photon could yield a PMT output spanning −0.51 mV to −1.61 mV, that is a typical noiseless output of −1.06 mV for the Raman lines of interest explored herein +/−0.55 mV (i.e., 3σ) of noise. Therefore, PMT responses that achieve an amplitude equal to or less than −0.78 mV, and thus are both observable on the system DAQ and more negative than the noise envelope, would indicate (at least) one photon arrival, and would translate to one count in the single-photon counting algorithm. Although this disclosure focused on developing a means to enable multi-photon counting, this threshold remains a crucial parameter for the comparison of results obtained with single- and multi-photon counting algorithms.

It should be noted that in this case the 556 to 574 nm range is that necessary to look at the specific chemicals currently under investigation. The process can be carried out for any range of interest within the response bandwidth of the optical sensor. When the range is tight, the energy of a photon varies very little, making the analysis process very straightforward. It is conceivable that over a broader range one might need to adjust the calibration to account for larger changes in photon energy. This is straightforward, as the range is determined by the chemicals being investigated—it would just take an additional calibration to check photon energy equivalence at one end of an extended test spectrum and a check at the other end. Then the threshold is determined based on the position of the selected range in the spectrum.

Multi-photon counting: Two different multi-photon counting approaches are described herein. The first simply relies on assessment of the variations in the peak amplitude of the PMT output voltage, hereafter referred to as the voltage method. The second considers the area under the PMT output voltage waveform over time, hereafter referred to as the area method. While this quantity is representative of magnetic flux (i.e., volt-nanoseconds), it serves as a proxy for the energy received by the PMT from incident photons, as power is given by the square of voltage over resistance, and the resistive load across which the PMT output is observed to be constant. Multiplying this power quantity by time, yields an energy measure (e.g., Watts=Joules/second-→Joules/second·second=Joules). As we intend to employ this measure to relate PMT output to input received, effectively in the form of a calibration curve, we opt for a proxy of this energy—that is volt-nanoseconds—which will provide a linear relationship between collected scattering and output of the PMT.

Figure 6:
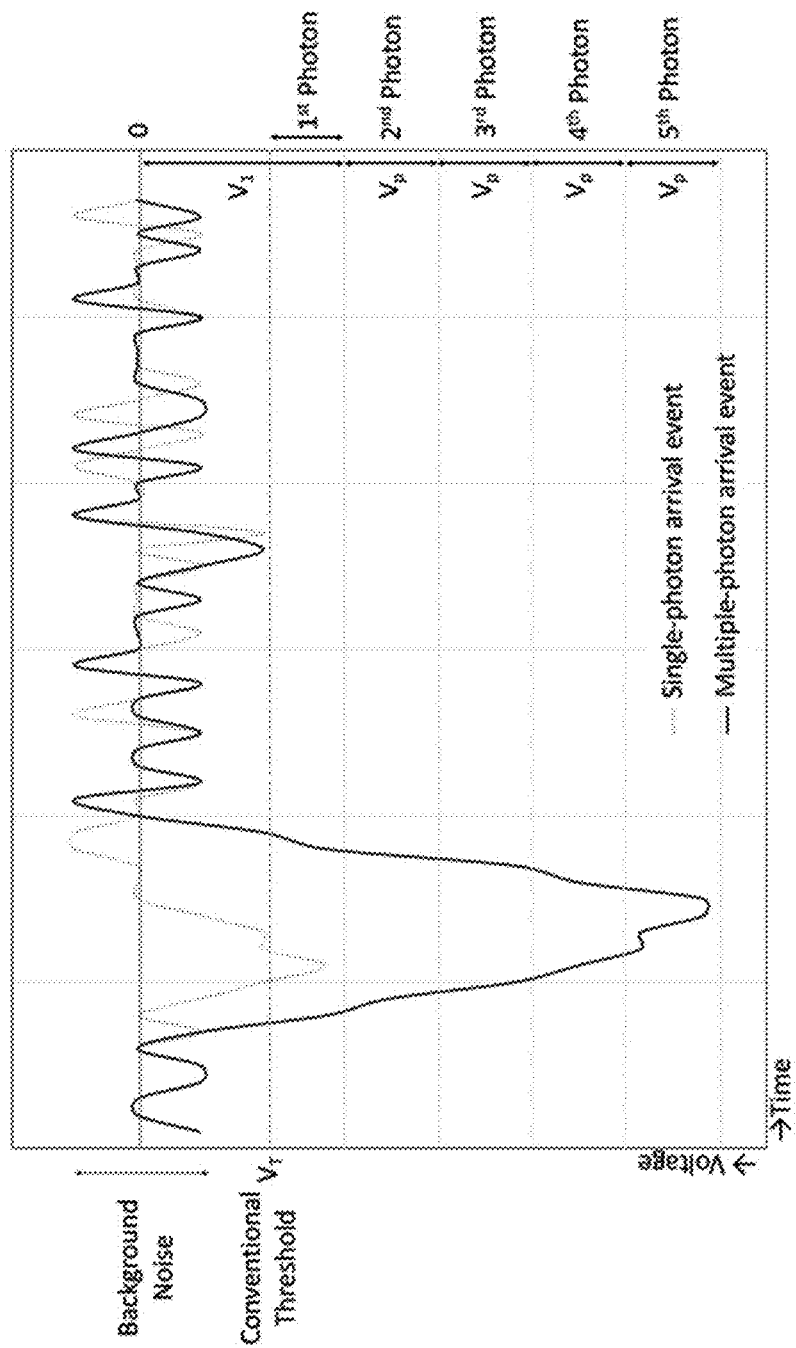
FIG. 6 shows Multiple Photon Counting Algorithm based on Voltage.

Multi-Photon Counting Algorithm—Voltage Method:

The voltage based counting algorithm focuses on the minimum (most negative) amplitude of a PMT response without considering the response duration. This algorithm builds on the conventional single photon counting algorithm described above by defining a series of thresholds that facilitate evaluation of multi-photon events. As with conventional single photon counting, a minimum voltage threshold must be crossed for a signal to be interpreted as a photon. This threshold, $V_T$, is again −0.55 mV (i.e., 3σ), which due to the data acquisition bit resolution translates into a first observable bit level at −0.78 mV. Another threshold, $V_1$, represents the minimum (most negative) voltage that is likely to stem from the first photon contributing to the PMT output. This value, $V_1$, is conservatively taken as the noiseless PMT response to one photon arrival, $V_p$=−1.06 mV, observed in the presence of maximum system noise which tends to be statistically bounded within the 3σ noise band, such that $V_1=V_p-3σ=-1.61$ mV. Thus, if the minimum voltage in a response falls in between $V_T$ and $V_1$, this response contains a single-photon arrival event in the voltage method. Additional photon arrivals are then evaluated against successive thresholds defined as increments of voltage equivalent to the noiseless PMT response to one (additional) photon arrival ($V_p$). The threshold value ($V_1$) and the voltage of one photon arrival ($V_p$) will differ for any given apparatus based on system components and related background noise. When processing the data, the algorithm is initiated by determining the minimum (most negative) amplitude ($V_M$) in a PMT response. The number of photons, n, is then given by n=(($V_M-V_1$)/$V_p$)+1 and rounded down to the nearest integer. The conceptual foundation for this method is illustrated in FIG. 6

Figures 7A, 7B:
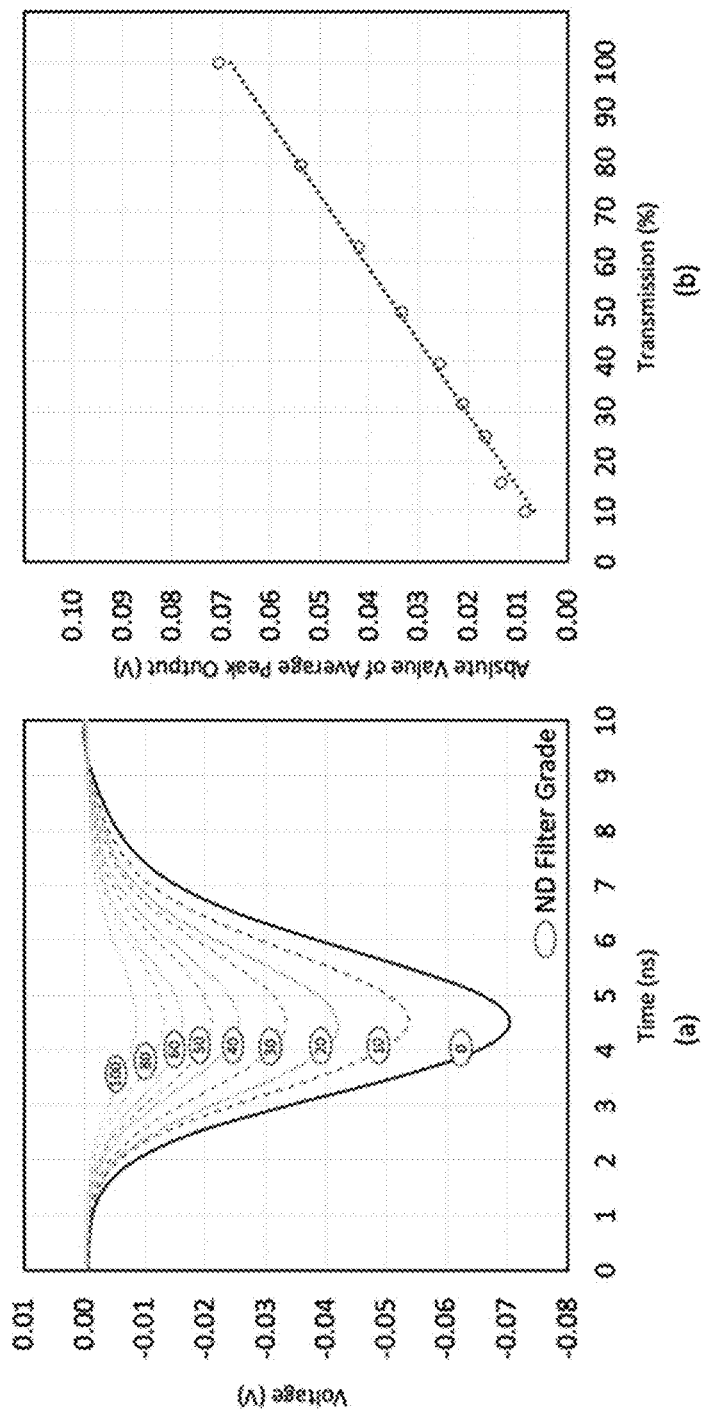
FIGS. 7A and 7B show observations of a 532 nm excitation pulse through ND filters.

In this method, it is assumed that the near simultaneous arrival of multiple photons will drive a change in PMT output voltage that is a corresponding multiple of the output voltage generated by a single photon, and that for coincident arrivals, PMT response time is effectively constant regardless of observed signal amplitude. These assumptions are validated by examining the PMT response to consistent 532 nm excitation pulses observed through different grades of neutral density (ND) filters, as shown in FIG. 7. In this figure, each response curve represents the average of 15 pulse acquisitions. It can be seen (FIG. 7A) that the start and end times of each response, as well as their full width at half maximum (FWHM) are consistent regardless of pulse amplitude (with the FWHM within 3.7% of the mean across all tests). Further, FIG. 7B also illustrates that changes in the intensity of the observed energy are accompanied by correspondingly linear changes in output signal, illustrating a near constant proportionality between input and output peak amplitudes.

Multi-Photon Counting Algorithm—Area Method:

The area based counting algorithm examines the PMT output voltage over time in response to incident stimuli, where, as noted above, the area under the waveform serves as a proxy for incident energy. As more photons arrive, more energy is incident on the PMT, and the PMT response may increase in amplitude and/or duration, and thus the area under the voltage versus time waveform also increases.

At the core of this method is thus determination of the area under the voltage time waveform produced by a single photon. This quantity is then combined with an additional area associated with background noise. These combined values establish an expected voltage time product that represents the arrival of a single photon and associated noise.

Figure 8:
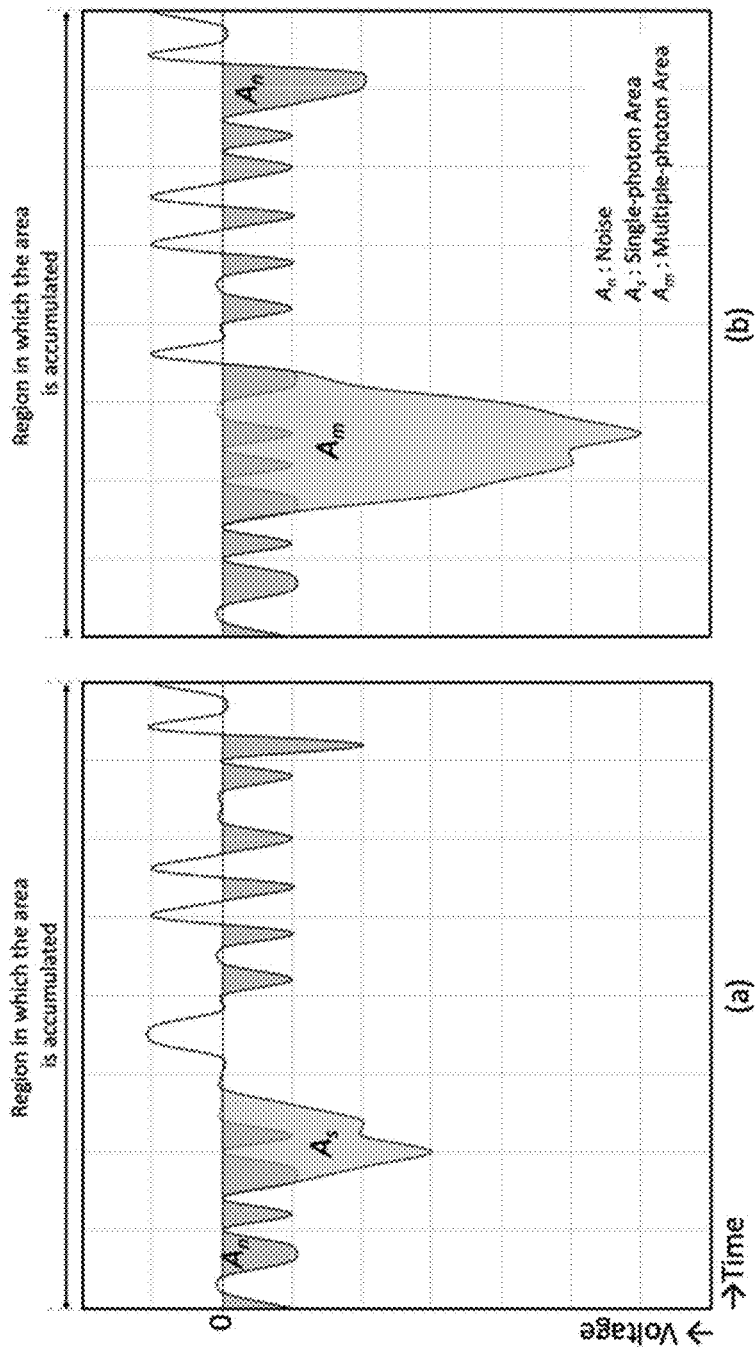
FIG. 8 shows a conceptual illustration of multiple-photon counting algorithm based on the area (voltage×time): (a) A single-photon arrival event; (b) A multiple-photon arrival event.

FIG. 8 provides a conceptual illustration of single and multi-photon arrivals as observed by a PMT. FIG. 8 section a illustrates a single-photon arrival event and the area created by the waveform is composed of two parts: one part that represents the noise ($A_n$) across the entire acquired time period, and another that represents the single photon arrival event ($A_s$). The total area of the waveform calculated below the zero amplitude (horizontal) axis is then $A_{total}=A_n+A_s$. If more than one photon arrives within the acquisition time period, such as the event shown in FIG. 8 (section b), the total area in a response, $A_{total}$, can be expressed as $$A_{total}=A_n+A_m=A_n+A_s \times m \qquad (1)$$

where m is the number of photons arriving, and is zero for a "no photon arrival" event, or a positive integer for an event involving the arrival of one or more photons.

From an energy point of view, $A_m$ is approximated as a multiple of $A_s$, and this assumption is applied to estimate how many photons arrive. However, there is no definitive value of $A_n$ or $A_s$—they are variables that each have a range of reasonably expected values. The value of $A_s$ is different from pulse to pulse, but limited within a boundable range based on the characteristics of the PMT and data acquisition system, and to a much smaller extent, the compound and related Raman line under investigation (noting that the variation in photon energy from the shortest (~540 nm) to longest (~700 nm) wavelength in a typical Raman signature with 532 nm excitation is ~$0.84 \times 10^{-19}$ J, which for the system employed translates into a variation of 0.25 mV in PMT output, and only 0.03 mV over the range of Raman lines studied herein). Noise is random, and its amplitude at any given time thus differs within and between each PMT response; however, it too occurs over an observable and thus boundable range for any given system. Electrical noise can typically be characterized by a normal distribution (as the Poisson characteristics of electrical current movement approach a normal distribution for large numbers), and thus the range of the value $A_n$ can be assessed through statistical analysis of noise observations.

In order to determine the one-photon signal area and noise area value ranges to apply for the multi-photon counting algorithm, the statistical distributions of the noise area, $A_n$, and total area, $A_{total}$, were explored across different test scenarios. For the analyses presented, based on the available DAQ sampling rate and bit resolution, the response waveform from each laser pulse was recorded for a duration of 30 ns, which encompassed an 8 ns region of potential photon arrivals (as per FIG. 2 section (b)) with a minimum time bin of 0.5 ns, and a minimum voltage resolution of 0.39 mV.

Figure 9:
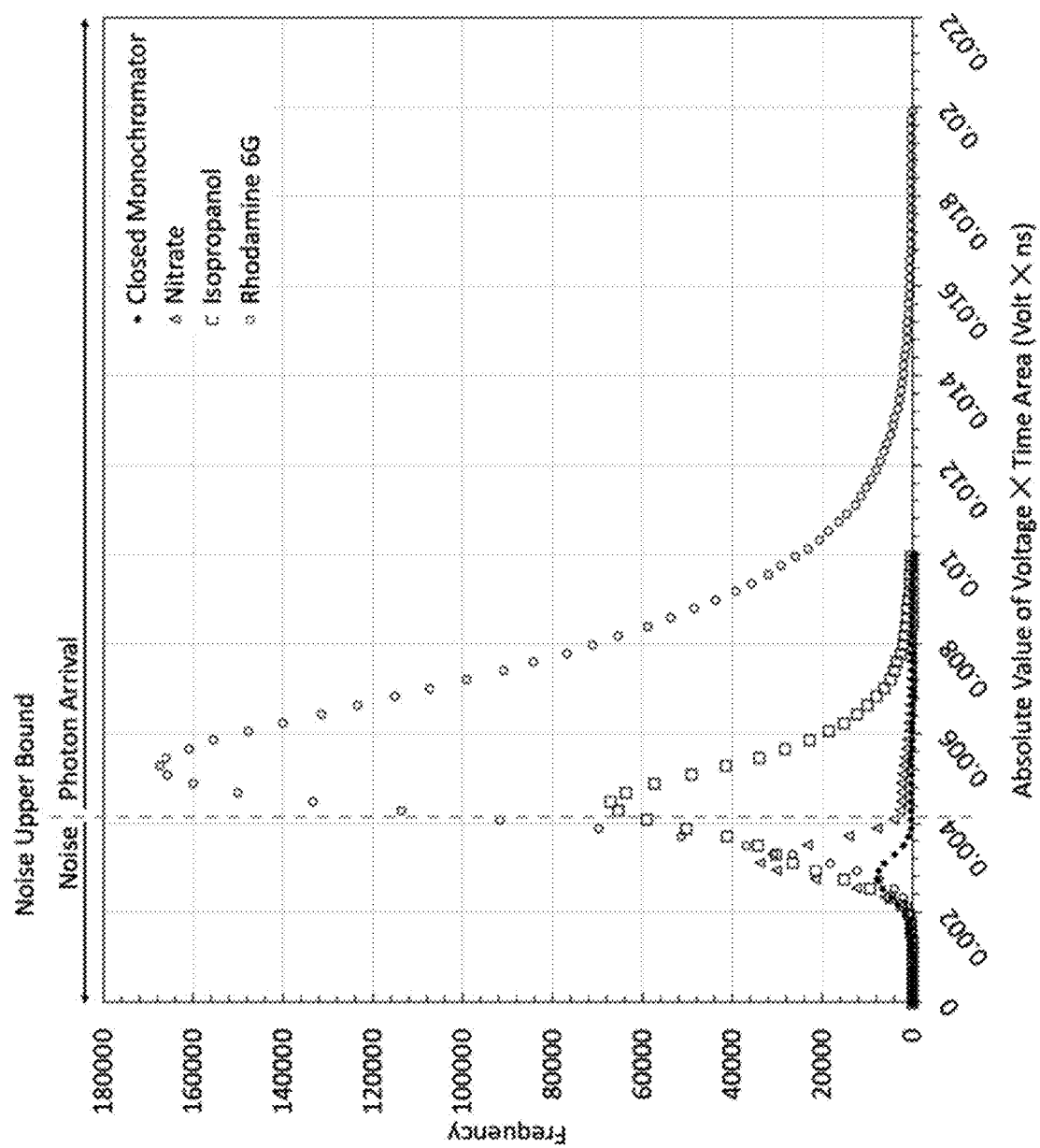
FIG. 9 shows area value distributions of PMT responses under different test scenarios of this disclosure, including closed monochromator, 10 ppm nitrate solution, 60400 ppm isopropanol solution, and 0.0011 ppm rhodamine 6G solution.

Experiments were performed to assess $A_n$, by acquiring the output of the PMT when completely covered (i.e., closed monochromator, in total darkness) over a time period equivalent to five million pulse acquisitions (see FIG. 9). Importantly, note that $A_n$ is intended to represent non-photonic noise (e.g., electrical, thermal), not stray light background, as the objective of this particular test is to assess the area threshold indicative of a single photon arrival. To this end, and as noted earlier, the maximum voltage×time area of the closed monochromator response is unlikely to (routinely) exceed the value associated with a single photon, as its output is primarily the byproduct of line noise plus ohmic leakage and thermionic emission in the PMT, which at most could involve a full cascade of charge through the PMT dynode chain. It is of course possible that more than one noise stimulus could occur simultaneously, but these events are relatively rare and likely form the long-tail of the closed monochromator response. Thus, the upper bound of the bulk distribution of the closed monochromator responses serves as a good approximation of the threshold for a single photon event. This value can be determined from the data shown in FIG. 9. The mean value of the voltage×time area for the closed monochromator responses is −0.0028 V-ns, with a standard deviation of 0.00050 V-ns. These data are high in number and can be well characterized by a normal distribution, and thus the mean plus three standard deviations, an area value of −0.0043 V-ns, provides an indication of the upper bound of closed monochromator response with 99.7% confidence, and at the same time is a likely indicator of the minimum area that could be associated with a single photon arrival.

This boundary is validated by an assessment of the area that might be expected for a single photon event based on previously discussed observations of noise (described above), and measurements of the FWHM of the PMT response to scattered photon arrivals from low concentration nitrate tests. The FWHM for these single photon events is ~3.0 ns, based on the analysis of several thousand captured returns. Thus, the single photon area, which is a voltage time product, will include a contribution from noise over the entire observed photon arrival window, plus a contribution from the photon arrival itself, which occurs over 3.0 ns. The noise in the 8 ns photon arrival window can be approximated by the characteristics of the noise distribution already discussed above. As the noise is centered on the baseline and shown to be normally distributed, the mean amplitude of the noise below the baseline (the negative side of the normal distribution) can be determined from the statistics of a half-normal distribution as $\sigma\sqrt{2}/\sqrt{\pi}$, where $\sigma$ is the standard deviation of the associated normal distribution. Thus the noise area, $A_n$, below the baseline, which is employed in the analysis herein is estimated as (8 ns) ($\sigma\sqrt{2}/\sqrt{\pi}$ mV)=(8 ns) [(−0.18 mV) 0.80]=−0.00115 V-ns. This can then be combined with the noiseless area of one photon arrival, $A_s$, which is −1.06 mV (3 ns)=−0.0032 V-ns, to yield an area that could be expected for the first photon arrival with noise (i.e., $A_n+A_s$) of −0.0044 V-ns, which is in good agreement with the experimentally observed upper bound of the bulk distribution of the closed monochromator responses discussed above. Although there can of course be some variation in this range based on the difference in the energy of incident photons across an entire Raman spectrum as noted above, this conceptual model facilitates interpretation of the experimentally observed area values.

To be conservative, and in consideration of the DAQ characteristics employed in experiments and analysis leading to this disclosure, −0.0044 V-ns was chosen as the threshold for a single-photon area response in the presence of noise in the analysis presented herein, with the additional criterion that any PMT response deemed to represent a photon arrival must achieve at least this area, and also contain a voltage peak in excess of the single photon voltage threshold noted earlier (i.e., −0.78 mV). Thus, when processing acquired PMT response data, $A_n$ is subtracted from the waveform's total area with respect to the horizontal axis, and the remainder, $(A_{total}-A_n)=A_m$, is divided by the area associated with a single photon, $A_s$, and this quotient is rounded down to the nearest integer to yield the number of photons (m) in an arrival event.

With the above concepts in mind, experiments were performed on a 10-ppm aqueous nitrate-N solution which was analyzed as a sample likely to be representative of a low concentration, weak scatterer, with primarily single-photon returns. PMT responses to five million laser pulses, each consisting of a 30 ns full waveform acquisition, were collected at the Raman spectral peak of 1045 cm$^{-1}$ (vNO symmetric stretch). Examining FIG. 9, it can be seen that >90% of the PMT responses for the nitrate test remain within a range bounded by the minimum threshold for a photon, $A_{Total}=A_n+A_s=-0.0044$ V-ns, and the boundary that must be exceeded to assert the arrival of two photons, $A_{Total}=A_n+2A_s=-0.0076$ V-ns, affirming the hypothesis that the nitrate sample is quite representative of a single-photon scatterer. In addition, to confirm that there would be a notable change in PMT responses associated with stronger scatterers, a similar set of tests were performed on samples of 60400 ppm isopropanol at 819 cm$^{-1}$ (C—C stretching), and 0.0011 ppm rhodamine 6G at 1363 cm$^{-1}$ (C—C stretching). The distribution of the area values (presented as absolute values) for each sample are also plotted as histograms in FIG. 9. In contrast to the nitrate tests, it can be seen that the majority of the PMT responses for the isopropanol and rhodamine tests are well above the single photon area range, reinforcing the notion that these compounds yield multi-photon returns.

Figure 10:
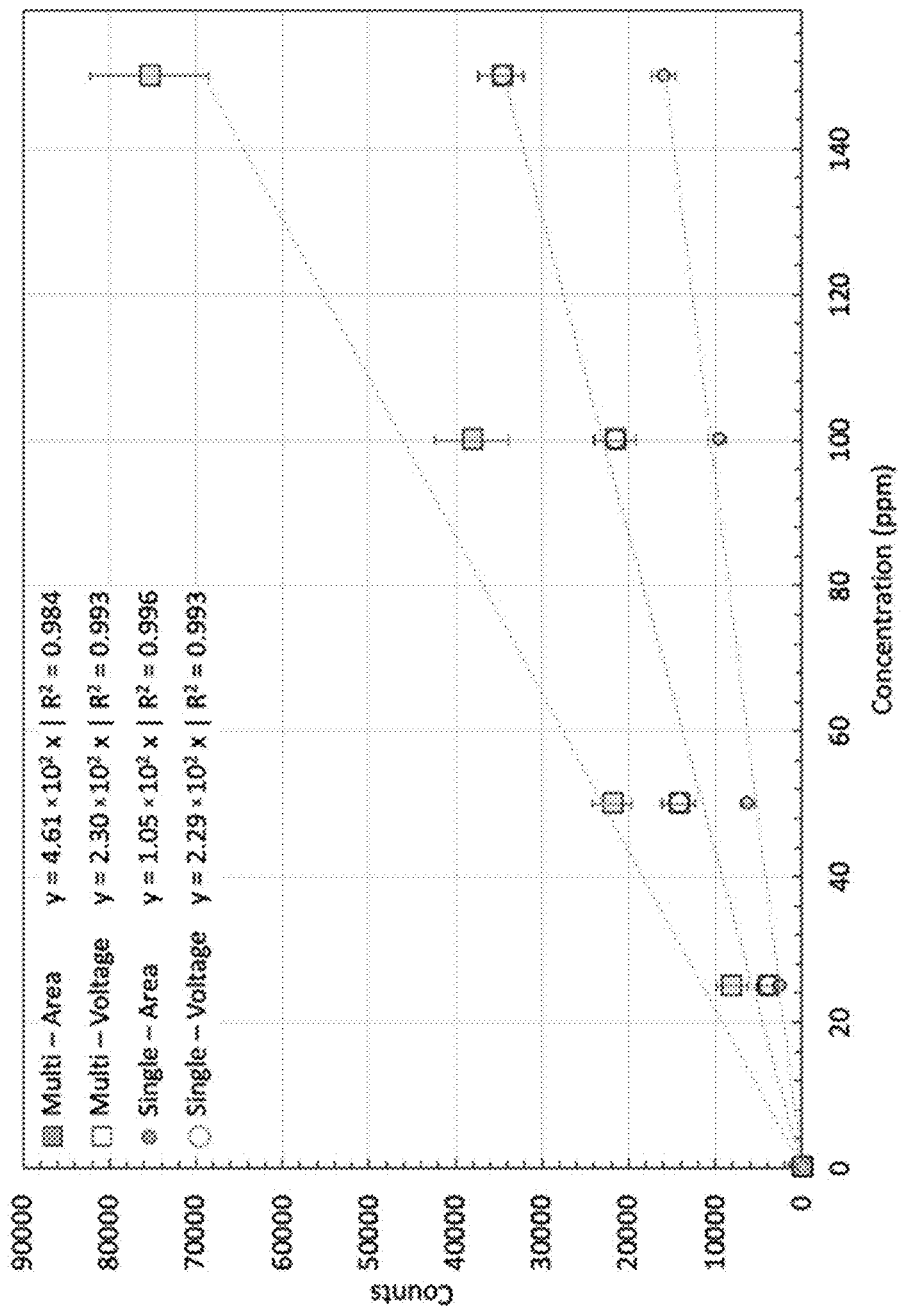
FIG. 10 shows Comparison of calibration curves obtained for aqueous solutions of nitrate-N at the 1045 $cm^{-1}$ (vNO symmetric stretch) using both voltage and area variants of the single- and multi-photon counting algorithms.
Figure 11:
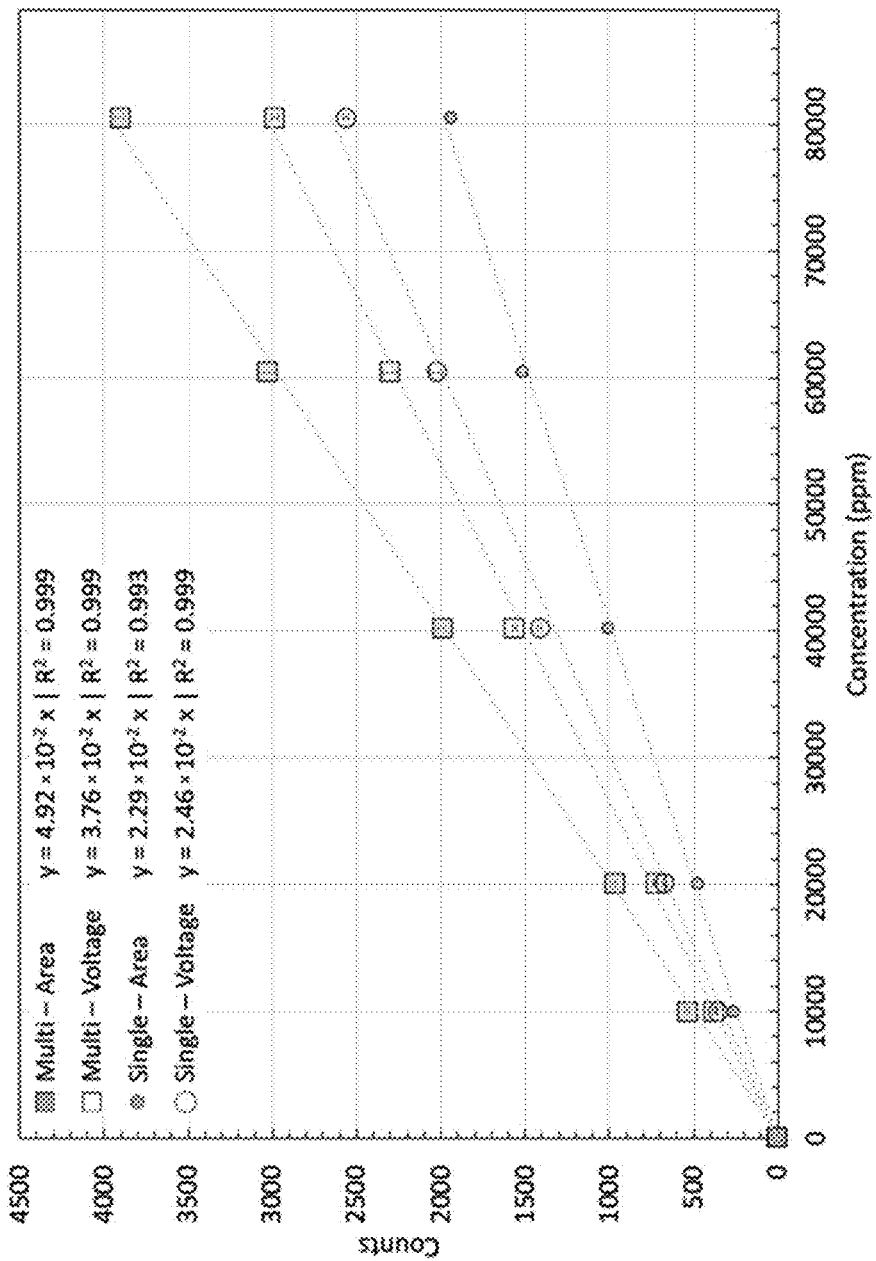
FIG. 11 shows comparison of calibration curves obtained for aqueous solutions of isopropanol at the 819 cm$^{-1}$ (C—C stretching) using both voltage and area variants of the single- and multi-photon counting algorithms of this disclosure.
Figure 12:
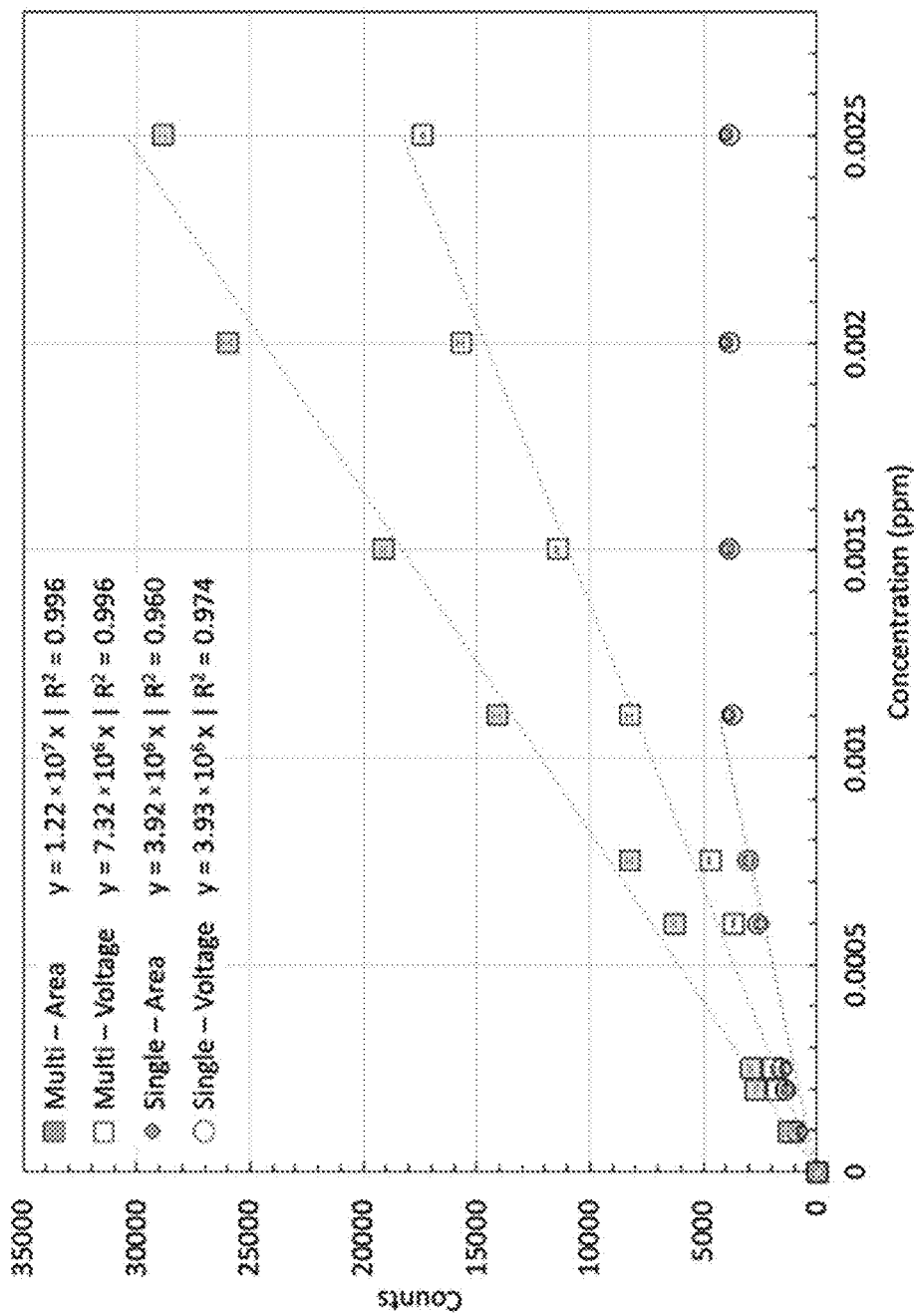
FIG. 12 shows comparison of calibration curves obtained for aqueous solutions of rhodamine 6G at the 1363 cm$^{-1}$ (C—C stretching) using both voltage and area variants of the single- and multi-photon counting algorithms.

The effectiveness and potential benefits of the above outlined counting algorithms were evaluated by comparing the results of calibration tests performed on single compound aqueous solutions containing a range of concentrations of three different analytes: nitrate, isopropanol, and rhodamine 6G, as shown in FIGS. 10, 11, and 12, respectively. The calibration curves present Raman measurement values and related standard error for observations obtained at 1045 cm$^{-1}$ ((vNO symmetric stretch) for nitrate, 819 cm$^{-1}$ (C—C stretching) for isopropanol, and 1363 cm$^{-1}$ (C—C stretching) for rhodamine 6G. Five tests, each including PMT responses to 900,000 laser pulses, were performed at each analyzed concentration of nitrate; and ten tests were performed at each analyzed concentration for isopropanol and rhodamine 6G, with each test including PMT responses to 10,000 and 5,000 laser pulses, respectively. For any given test, acquired PMT responses were post-processed four ways: (1) single-photon counting via voltage threshold, (2) single-photon counting via voltage×time area (i.e., if the total area is larger than the threshold area, count as one), (3) multi-photon counting via multiple voltage thresholds, and (4) multi-photon counting via voltage×time area, enabling comparisons that reflect differences in the processing algorithms rather than the testing variables.

As shown in FIGS. 10 and 11, the single-photon counting algorithms employing either a voltage threshold or an area discriminator (voltage time product) consistently provide a strong linear relationship between analyte concentration and counts in the nitrate and isopropanol tests. Notably, the slope of the area-based curves is lower than that of the voltage-based calibration curves for the same analyte. This is because the area algorithm applies a voltage threshold (the same as that used in the single-photon voltage algorithm) to ensure that at least one photon arrives within a response before further using an area threshold to check if the arrival event satisfies the area algorithm criteria. Therefore, the area algorithm is stricter than the voltage algorithm and thus has fewer counts in its results. This implies that some responses that are perceived to be photon arrivals by the voltage algorithm do not involve an area equivalent to a photon arrival, and may thus be inadequately resolved by the DAQ, or may be noise. The rhodamine 6G single photon counting results, shown in FIG. 12, reflect a similar linear trend with concentration and relationship between voltage and area counting approaches at concentrations below 0.0011 ppm, but then both algorithms yield responses that plateau at higher concentrations, indicating that a count is obtained for each laser pulse, and the detector (using the noted algorithms) is effectively saturated.

The results obtained analyzing the same data sets using the multi-photon counting algorithms reflect several important differences relative to those obtained using the single-photon counting algorithms. While strong linear relationships are again achieved between analyte concentrations and the counts defined by the multi-photon voltage and area counting methods, it is clear that the slopes of multi-photon counting calibration curves are greater than their single-photon algorithm counterparts in all cases. Further, comparing the two approaches to multi-photon counting, it can also be seen that the slope of the calibration curve obtained using the area method is consistently greater than that obtained from the voltage method. These outcomes are noteworthy on several fronts. First, the notable difference in calibration curve slope between the multi-photon voltage method and the single photon methods for the rhodamine 6G tests and isopropanol tests, indicates that multi-photon arrival events are indeed generated in these tests—events that go uncounted in single-photon counting approaches. Essentially, much more return energy is imparted on the detector than is typically converted to an indication of analyte presence in a single-photon counting approach. These additional counts also clearly increase proportionally with analyte concentration providing a robust, linear calibration curve. The increased slope of the calibration curve has merit in that it offers a greater difference in output for the same change in input relative to single-photon counting approaches. This characteristic can drive either enhanced sensitivity or enable the accumulation of counts to achieve valid signals more rapidly than would be possible by registering only single-threshold events. Lastly, the separation of multi-photon voltage and area curves indicates that the area algorithm captures counts that are not accounted for when using the voltage algorithm. These counts are likely the result of multiple photons that arrive briefly separated in time, and thus fail to drive a response amplitude (peak height) that would meet the voltage threshold for additional photons, yet do increase the voltage·time area under the response curve.

Beyond the results obtained from tests performed on aqueous solutions of isopropanol and rhodamine 6G, the small difference in the nitrate calibration curve slopes derived from the single-photon and multi-photon voltage counting algorithms reinforces the notion that nitrate is indeed a weak scatter. Most of the scattering observations include a maximum of one photon, and only a small number provide greater returns. In addition, the increase in the slope of the multi-photon area calibration curve relative to those of the voltage determinations indicates that when multiple photons do result from a laser pulse, their arrivals tend to be more in series than parallel, and thus do not often overlap to drive a change in the peak (most negative) voltage output of the PMT. Nonetheless, this improvement in observable signal can have substantial benefits in experiments intended to detect a weak scatter.

It is also important to highlight that another benefit of the multi-photon counting algorithm is apparent when reviewing the rhodamine 6G test results in FIG. 12, particularly in the region from 0.0015 ppm to 0.0025 ppm. While the single-photon counting algorithms yield a number of photon counts that plateaus and is nearly identical to the number of laser pulses, the multi-photon counting algorithms continue to extend the observed linear relationship between analyte concentration and determined counts. Multi-photon counting algorithms thus offer the potential to distinguish and quantify higher concentrations than can be observed by the single-photon counting algorithms, effectively extending the useful range of the Raman system.

This disclosure introduces a novel data processing algorithm to facilitate multi-photon counting in Raman spectroscopy that offers the potential to improve the efficiency of typical analyses and extend the applicability of any given Raman apparatus to a broader range of analyses contexts. While Raman spectroscopy is well established as an analytical method, Raman apparatus are often specifically optimized to observe weak or strong scatterers by respectively adopting photon counting or flux integrating sensing approaches, inherently limiting their versatility. With weak scatterers, systems usually include a detector that employs a binary threshold to repeatedly discriminate and count photon arrivals. While highly sensitive, this approach will ignore the potential gains offered by multi-photon arrivals and may result in a saturated output when used with higher yield compounds. With strong scatterers, systems typically rely upon detectors that integrate photon-induced electric charge to obtain an indication of total collected light. This approach tends to be rapid, but is typically incapable of observing weak scatterers and/or analytes at low concentrations.

In contrast to the aforementioned traditional measurement approaches, the multi-photon counting methods of this disclosure facilitate a seamless bridge in observation capability across the range of weak to strong scatterers. By digitally acquiring and post-processing the response of a PMT to each pulse of the Raman system excitation source, the novel algorithms enable robust statistical analysis of photon acquisitions and, in turn, the ability to approximate the photon count of multi-photon arrival events. Two specific methods of multi-photon counting are introduced herein: (1) the voltage method, which resolves the peak amplitude of the PMT output into the response associated with a single photon in the presence of system noise, plus increments of voltage equivalent to the noiseless PMT response to additional photon arrivals, and (2) the area method, which treats the product of PMT output voltage and time as a proxy for received energy, and resolves the total area under the PMT output waveform into a combination of system noise and some multiple of photon arrivals.

Data from Raman analyses of aqueous solutions of nitrate, isopropanol, and rhodamine 6G, which respectively span the range from weak to strong scatterers, were post-processed using traditional as well as the novel counting methods, providing a consistent basis for comparison that demonstrates the versatility and effectiveness of the newly developed counting algorithms. Specific benefits of the novel algorithms, include the following:

Linear calibration over a broad range of weak to strong scatterers: Both the voltage and area multi-photon counting methods yielded robust calibration curves relating Raman system output to analyte concentration across the entire studied range of weak to strong scatterers.

Increased sensitivity: The multi-photon algorithms consistently resulted in calibration curves with greater slopes ($\Delta$ counts/$\Delta$ concentration) than the single-photon methods, supporting the potential for improved system sensitivity and/or acquisition efficiency compared to single-threshold analyses of the same data set.

Improved sensor performance for high Raman yield analyses: Results also demonstrated that the multi-photon counting algorithms increase the upper analysis limit for high Raman-yield compounds, shifting the sensor saturation threshold to a higher concentration in typical concentration vs. intensity calibration curves.

The novel multi-photon counting algorithms maintain the traditional advantages of the Raman technique, such as rapid analysis and limited to no sample preparation, while improving system sensitivity and efficiency without costly component upgrades. While it is acknowledged that the novel methods require high speed data acquisition hardware and robust data transfer and storage capability, the costs of equivalent data management functionality are rapidly decreasing, and the system modifications needed to obtain the results presented are straightforward to implement, especially relative to more significant sensor, optics, and/or excitation source improvements that would be required to achieve similar benefits by other means. Further, it is important to note that the specific sampling rate and bit resolution of the data acquisition system employed herein could be improved to obtain even more refined measurements of sensor output in amplitude and time. Moreover, additional signal processing techniques such as matched filter methods could further enhance discernment of photon arrivals given that all acquired data is post-processed in the novel analysis approach, highlighting the opportunity for further improvement in the results obtained via the novel methods. With these factors in mind, there is significant potential for the novel multi-photon counting approaches to be realized with even greater sensitivity and to enhance Raman and other spectroscopic applications having similar photon-counting needs.

It should be recognized that while this disclosure described a method and system useful for multiple-photon counting with respect to a specific photonic sensor, the approaches described here are not limited to a specific optical sensor and are applicable and can be adapted to any optical sensing system, not necessarily one used for spectroscopy.

In some instances, such as when the methods of this disclosure are applied to nitrate solutions, as a non-limiting example, the spectroscopic device can either be time-resolved or not since there may not be much fluorescence. Thus, the time-resolved aspect of this disclosure is intended to be non-limiting for the applications of the methods of this disclosure.

It should be recognized that use of multi-photon count determinations (amplitude or amplitude time product) in Raman spectroscopic applications as described here can be used to develop a (linear) calibration relating Raman system output to analyte concentration, which, in turn, can be applied for samples representing a range from weak to strong scatterers.

It should be recognized that use of multi-photon count determinations (amplitude or amplitude time product) in Raman spectroscopic applications to develop (linear) calibration relationships relating Raman system output to analyte concentration with greater slopes (Δ counts/Δ concentration) than the single-photon methods, can yield improved system sensitivity and/or acquisition efficiency compared to single-threshold analyses of the same data set.

It should be further recognized that use of multi-photon count determinations (amplitude or amplitude time product) in Raman spectroscopic applications increase the upper analysis limit for high Raman-yield compounds, shifting the sensor saturation threshold to a higher concentration in typical concentration vs. intensity calibration curves.

While the methods and the systems of this disclosure are described above with respect to Raman spectroscopy, it should be recognized that the methods, systems, and approached detailed here are applicable to other spectroscopic methods, such as but not limited to Near Infrared Spectroscopy and fluorescence spectroscopy. In general, it should be recognized that the methods and systems of this disclosure are applicable or can be adapted to any application involving photon counting, or any transductions system where energy can be related to input.

While the present disclosure has been described with reference to certain embodiments, it will be apparent to those of ordinary skill in the art that other nigh-infinite embodiments and implementations are possible that are within the scope of the present disclosure without departing from the spirit and scope of the present disclosure. It is therefore intended that the foregoing detailed description be regarded as illustrative rather than limiting.

We claim:

1. A method of determining the contributions of multiple incident photons to an output of a sensor, the method comprising:
    providing a photonic sensor having a sensor input and capable of generating an electrical signal proportional to a number of photons interacting with the photonic sensor input as a function of time;
    calibrating the photonic sensor such that a response of the photonic sensor to a single photon detected is in a waveform having an amplitude and a time, wherein the product of the amplitude and the time is statistically bounded;
    determining a probabilistic boundary between one or more electrical, optical, and thermal sources of noise of the sensor;
    acquiring a response wave form from the photonic sensor through analog-to-digital conversion with a resolution in amplitude and time corresponding to accuracy required in quantifying the response wave form;
    storing each acquired response wave form, individually, in a format selected from the group consisting of real-time and buffered packets in digital form; and
    determining a total count of likely photon arrivals for a specific time resolved acquisition.

2. The method of claim 1 wherein the total count of likely photon arrivals is determined by:
    a) comparison of the waveform amplitude to the amplitude expected from acquisition-specific baseline noise plus the contribution of a single photon arrival from the above noted calibration, (b) division of the fraction of the waveform amplitude exceeding that associated with a the baseline noise plus the first single photon arrival, by the amplitude associated with a single photon arrival from the above noted calibration, and (c) summation of the counts associated with (a) and (b) to yield a total count of likely photon arrivals (a multi-photon count) for the specific time resolved acquisition; and
    effecting a summation of the count of photon arrivals obtained based on amplitude evaluation from each specific time resolved acquisition, for all time resolved acquisitions performed in a given observation period, yielding a total count of likely photon arrivals (a multi-photon count) associated with the amplitude evaluation.

3. The method of claim 2, further comprising step of applying an automatic acquisition-specific signal offset correction to each response from the sensor, prior to determining a total count of likely photon arrivals.

4. The method of claim 2, wherein the amplitude of the wave form represents voltage.

5. The method of claim 1 wherein the total count of likely photon arrivals is determined by:
    (a) comparison of the waveform amplitude time product to the amplitude time product expected from acquisition-specific baseline noise plus the contribution of a single photon arrival from the above noted calibration, (b) division of the fraction of the waveform amplitude time product exceeding that associated with a the baseline noise plus the first single photon arrival, by the amplitude time product associated with a single photon arrival from the above noted calibration, and (c) summation of the counts associated with evaluations (a) and (b) to yield a total count of likely photon arrivals (a multi-photon count) for the specific time resolved acquisition; and
    effecting a summation of the count of photon arrivals obtained based on amplitude evaluation from each specific time resolved acquisition, for all time resolved acquisitions performed in a given observation period, yielding a total count of likely photon arrivals (a multi-photon count) associated with the amplitude evaluation.

6. The method of claim 5, further comprising step of applying an automatic acquisition-specific signal offset correction to each response from the sensor, prior to determining a total count of likely photon arrivals.

7. The method of claim 3, wherein the amplitude of the wave form represents voltage.

8. A method of capturing multi-photon contributions in Raman spectroscopy, comprising:
    a) establishing a baseline noise value for a photonic detector with no incident photons from a photon source;
    b) measuring a first response value from the photon detector to a single photon incident thereupon from the photon source;
    c) subtracting the baseline noise value from the first response value to yield a calculated single photon value;
    d) pulsing a photon source at a Raman target to generate a plurality of inelastically backscattered photons;
    e) measuring a second photon detector response to incident backscattered photons from the Raman target;
    f) subtracting the baseline noise value from the second response value to yield a Raman target response value;
    g) comparing the single photon response value to the Raman target response value; and
    h) calculating the number of inelastically scattered photons incident on the photon detector.

9. A computer-implemented method of determining the number of photons contributing to an output of a photonic sensor, comprising steps of:

receiving an electrical signal from the photonic sensor proportional to a number of photons the photonic sensor detects at its input as a function of time;

wherein the photonic sensor is calibrated such that a response of the photonic sensor to a single photon detected is in a waveform comprising an amplitude and time, wherein the product amplitude X time is statistically bounded;

determining a probabilistic boundary between one or more of electrical, optical, and thermal sources of noise of the sensor;

acquiring each response wave form from the sensor through analog-to-digital conversion with a resolution in amplitude and time corresponding to accuracy required in quantifying the response;

storing each acquired response, individually, in real-time, or in buffered packets in digital form;

determining the number of photons for a specific time resolved acquisition by a method comprising a) comparison of a waveform amplitude to the amplitude expected from acquisition-specific baseline noise plus the contribution of a single photon arrival from the above noted calibration, (b) division of the fraction of the waveform amplitude exceeding that associated with the baseline noise plus the first single photon arrival, by the amplitude associated with a single photon arrival from the above noted calibration, and (c) summation of counts associated with (a) and (b) to yield the number of photons for the specific time resolved acquisition; and effecting a summation of the count of photon arrivals obtained based on amplitude evaluation from each specific time resolved acquisition, for all time resolved acquisitions performed in a given observation period, yielding the number of photon arrivals associated with the amplitude evaluation.

10. The computer-implemented method of claim 9, further comprising a step of applying an automatic acquisition-specific signal offset correction to each response from the sensor, prior to determining a total count of likely photon arrivals.

11. The computer-implemented method of claim 9, wherein the amplitude of the wave form represents voltage.

12. A computer-implemented method of determining the number of photons contributing to an output of a photonic sensor, comprising steps of:

receiving an electrical signal from the photonic sensor proportional to a number of photons the photonic sensor detects at its input as a function of time;

wherein the photonic sensor is calibrated such that a response of the photonic sensor to a single photon detected is in a waveform comprising an amplitude and time, wherein the product amplitude X time is statistically bounded;

determining a probabilistic boundary between one or more of electrical, optical, and thermal sources of noise of the sensor;

acquiring each response wave form from the sensor through analog-to-digital conversion with a resolution in amplitude and time corresponding to accuracy required in quantifying the response;

storing each acquired response, individually, in real-time, or in buffered packets in digital form;

determining the number of photons for a specific time resolved acquisition by a method comprising a) comparison of the waveform amplitude to the amplitude expected from acquisition-specific baseline noise plus the contribution of a single photon arrival from the above noted calibration, (b) division of the fraction of the waveform amplitude exceeding that associated with a the baseline noise plus the first single photon arrival, by the amplitude associated with a single photon arrival from the above noted calibration, and (c) summation of the counts associated with (a) and (b) to yield a total count of likely photon arrivals (a multi-photon count) for the specific time resolved acquisition; and effecting a summation of the count of photon arrivals obtained based on amplitude evaluation from each specific time resolved acquisition, for all time resolved acquisitions performed in a given observation period, yielding the number of photon arrivals associated with the amplitude evaluation.

13. The computer-implemented method of claim 12, further comprising a step of applying an automatic acquisition-specific signal offset correction to each response from the sensor, prior to determining a total count of likely photon arrivals.

14. The computer-implemented method of claim 12, wherein the amplitude of the wave form represents voltage.

15. A non-transitory computer-readable storage medium having stored thereon software instructions that, when executed by a processor, cause the processor to generate control signals for determining the number of photons contributing to an output of a photonic sensor, by executing the steps comprising:

determining the number of photons contributing to an output of a photonic sensor, comprising steps of:

receiving an electrical signal from the photonic sensor proportional to a number of photons the photonic sensor detects at its input as a function of time;

wherein the photonic sensor is calibrated such that a response of the photonic sensor to a single photon detected is in a waveform comprising an amplitude and time, wherein the product amplitude X time is statistically bounded;

determining a probabilistic boundary between one or more of electrical, optical, and thermal sources of noise of the sensor;

acquiring each response wave form from the sensor through analog-to-digital conversion with a resolution in amplitude and time corresponding to accuracy required in quantifying the response;

storing each acquired response, individually, in real-time, or in buffered packets in digital form;

determining the number of photons for a specific time resolved acquisition by a method comprising a) comparison of a waveform amplitude, or waveform amplitude time product, to the amplitude expected from acquisition-specific baseline noise plus the contribution of a single photon arrival from the above noted calibration, (b) division of the fraction of the waveform amplitude, or waveform amplitude time product, exceeding that associated with a the baseline noise plus the first single photon arrival, by the amplitude, or waveform amplitude time product, associated with a single photon arrival from the above noted calibration, and (c) summation of counts associated with (a) and (b) to yield the number of photons for the specific time resolved acquisition; and effecting a summation of the count of photon arrivals obtained based on amplitude evaluation from each specific time resolved acquisition, for all time resolved acquisitions performed in a given observation period, yielding the number of photon arrivals associated with the amplitude evaluation.

16. The non-transitory computer-readable storage medium of claim 15, further comprising instructions corresponding to a step of applying an automatic acquisition-specific signal offset correction to each response from the sensor, prior to determining a total count of likely photon arrivals.

17. The non-transitory computer-readable storage medium of claim 15, wherein the amplitude of the wave form represents voltage.

\* \* \* \* \*